United States Patent
Chen et al.

(10) Patent No.: US 8,896,283 B2
(45) Date of Patent: Nov. 25, 2014

(54) SYNCHRONOUS SWITCHING POWER CONVERTER WITH ZERO CURRENT DETECTION, AND METHOD THEREOF

(71) Applicant: Anpec Electronics Corporation, Hsin-Chu (TW)

(72) Inventors: Chih-Yuan Chen, Hsinchu (TW); Tzu-Yang Yen, Taipei (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 0 days.

(21) Appl. No.: 14/151,824

(22) Filed: Jan. 10, 2014

(65) Prior Publication Data

US 2014/0111168 A1    Apr. 24, 2014

Related U.S. Application Data

(63) Continuation-in-part of application No. 13/043,448, filed on Mar. 8, 2011, now abandoned.

(30) Foreign Application Priority Data

Jan. 7, 2011    (TW) .............................. 100100681 A

(51) Int. Cl.
*H02M 3/156* (2006.01)
*H02M 3/158* (2006.01)
*H02M 3/157* (2006.01)
*H02M 1/00* (2006.01)

(52) U.S. Cl.
CPC ............ *H02M 3/1588* (2013.01); *H02M 3/156* (2013.01); *Y02B 70/1491* (2013.01); *H02M 2001/0058* (2013.01)
USPC ........................................... 323/284; 323/283

(58) Field of Classification Search
USPC .......................... 323/282, 283, 284, 285, 351
See application file for complete search history.

(56) References Cited

U.S. PATENT DOCUMENTS

| | | | | |
|---|---|---|---|---|
| 4,357,572 | A * | 11/1982 | Andersen et al. | 323/286 |
| 7,872,461 | B2 | 1/2011 | Yamada | |
| 8,242,763 | B2 * | 8/2012 | Pigott et al. | 323/284 |
| 8,629,669 | B2 * | 1/2014 | Tournatory et al. | 323/285 |
| 2008/0211473 | A1 | 9/2008 | Tlaskal | |
| 2008/0298106 | A1 | 12/2008 | Tateishi | |
| 2009/0295350 | A1 | 12/2009 | Yamada | |

* cited by examiner

*Primary Examiner* — Gary L Laxton
(74) *Attorney, Agent, or Firm* — Winston Hsu; Scott Margo

(57) ABSTRACT

The synchronous switching power converter comprises an inductor; a down bridge transistor; and a zero current detection circuit comprising a zero current comparator for receiving a fixed comparing level at a negative input end for comparison to change state of a comparing result; a delay unit, for delaying the comparing result to change state of a turn off signal according to a compensation voltage, to turn off the down bridge transistor when determining current on the inductor is zero; a transient state adjusting circuit for indicating a transient period when detecting state of the turn off signal is changed; and an integrator for integrating the compensation voltage by analog manner to adjust value of the compensation voltage and providing to the delay unit within the transient period; wherein the zero current comparator determines the integrator to integrate positively or negatively within the transient period.

7 Claims, 9 Drawing Sheets

SYNCHRONOUS SWITCHING POWER CONVERTER WITH ZERO CURRENT DETECTION, AND METHOD THEREOF

CROSS REFERENCE TO RELATED APPLICATIONS

This is a continuation-in-part application of U.S. application Ser. No. 13/043,448, filed Mar. 8, 2011, which is included herein by reference.

BACKGROUND OF THE INVENTION

1. Field of the Invention

The present invention relates to a synchronous switching power converter, and more particularly, to a synchronous switching power converter with zero current detection.

2. Description of the Prior Art

For a synchronous switching power converter based on inductors, when the load is light, the converting efficiency can be increased through the discontinuous mode. Please refer to FIG. 1. FIG. 1 is a diagram illustrating a conventional synchronous switching power converter 100. The power converter 100 operates in the discontinuous mode so that the current on the inductor 104 will not be negative. When the up bridge transistor 101 is turned on, the inductor 104 is charged; when the down bridge transistor 102 is turned on, the inductor 104 is discharged so that the current on the inductor 104 is gradually decreased down to zero. When the current on the inductor 104 is decreased to zero, the down bridge transistor 102 has to be turned off immediately so that the current on the inductor 104 will not be negative.

If the down bridge transistor 102 is not turned off accurately at the moment of the current on the inductor 104 being zero, the converting efficiency of the power converter 100 in the discontinuous mode will be decreased. For example, if the down bridge transistor 102 is turned off before the moment of the current on the inductor 104 being decreased to be zero, the body diode of the down bridge transistor 102 will be turned on, which causes the conduction loss and the converting efficiency is decreased. Oppositely, if the down bridge transistor 102 is turned off after the moment of the current on the inductor 104 being decreased to be zero, the voltage at the node SW will be suddenly increased, which causes switching loss at the down bridge transistor 102, and the converting efficiency is decreased as well.

Therefore, it is very important to turn off the down bridge transistor 102 accurately so that the current on the inductor 104 can be decreased to be zero without being negative when to design the power converter 100. In the prior art, the voltage across the resistor $R_S$ is measured to determine if the current on the inductor 104 is decreased to be zero. When the comparator 106 of the control circuit 108 measures the voltage on the resistor $R_S$ is zero, the output of the comparator 106 changes, which makes the control circuit 108 output a signal to turn off the down bridge transistor 102.

Ideally, when the current on the inductor 104 is decreased to be zero, the down bridge transistor 102 should be turned off to limit the conduction and switching loss of the power converter 100. In fact, however, an offset voltage exists in the comparator 106, and therefore the moment of the voltage on the resistor $R_S$ being zero cannot be accurately determined. Consequently, the down bridge transistor 102 cannot be turned off accurately at the moment of the current on the inductor 104 being zero, and the conduction and switching loss of the power converter 100 cannot be effectively reduced.

SUMMARY OF THE INVENTION

The present invention provides a synchronous switching power converter with zero current detection. The synchronous switching power converter comprises an inductor; a down bridge transistor coupled to the inductor and a ground as a synchronous rectifier as the synchronous switching power converter; and a zero current detection circuit comprising a zero current comparator coupled between the inductor and the down bridge transistor for receiving a fixed comparing level at a negative input end for comparison to change state of a comparing result; a delay unit, for delaying the comparing result to change state of a turn off signal according to a compensation voltage, to turn off the down bridge transistor when determining current on the inductor is zero; a transient state adjusting circuit coupled to the zero current comparator for indicating a transient period when detecting state of the turn off signal is changed; and an integrator coupled to the zero current comparator and the transient state adjusting circuit for integrating the compensation voltage by analog manner to adjust value of the compensation voltage and providing to the delay unit within the transient period; wherein the zero current comparator determines the integrator to integrate positively or negatively within the transient period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
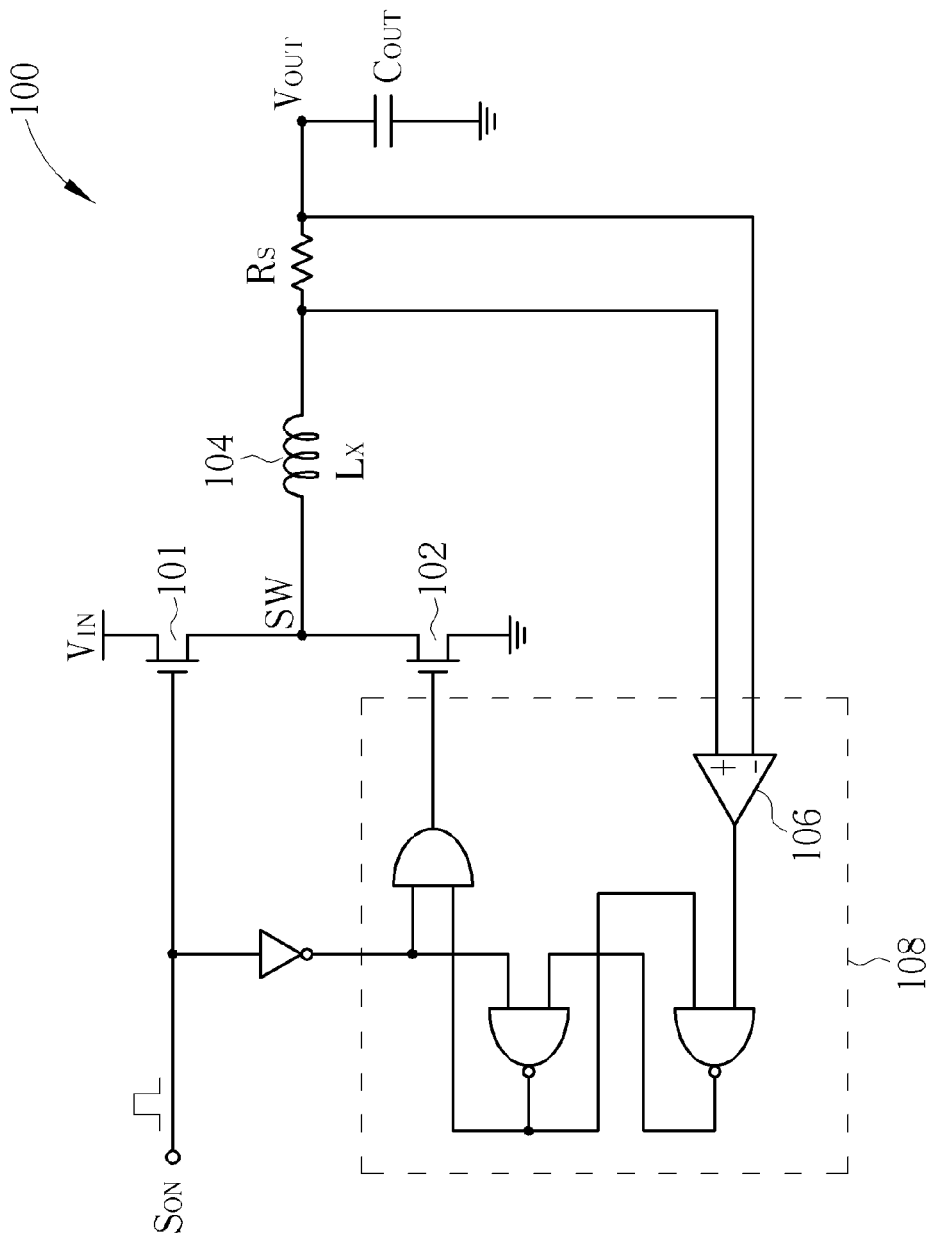
FIG. 1 is a diagram illustrating a conventional synchronous switching power converter.
Figure 2:
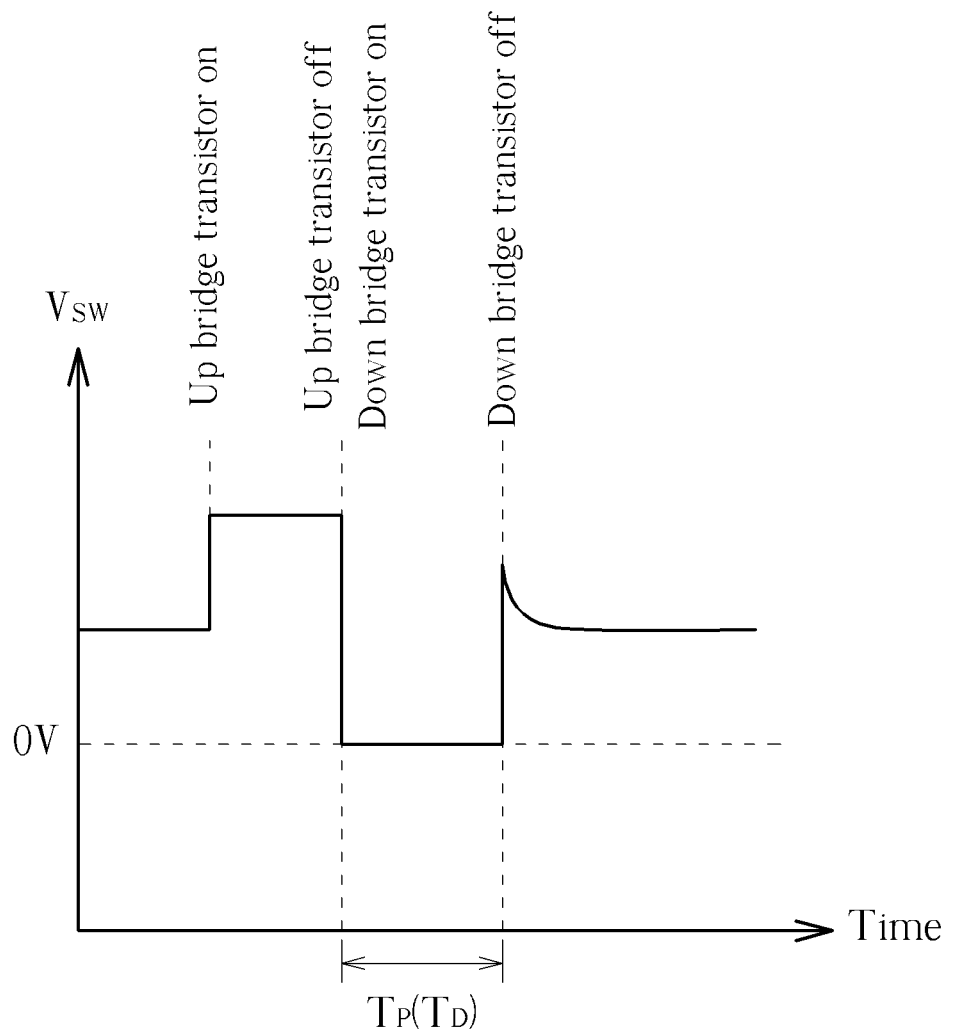
FIG. 2, FIG. 3, and FIG. 4 are diagrams illustrating relation between the moment of the down bridge transistor 102 being turned off and the voltage at the node between the down bridge transistor and the inductor.
Figure 3:
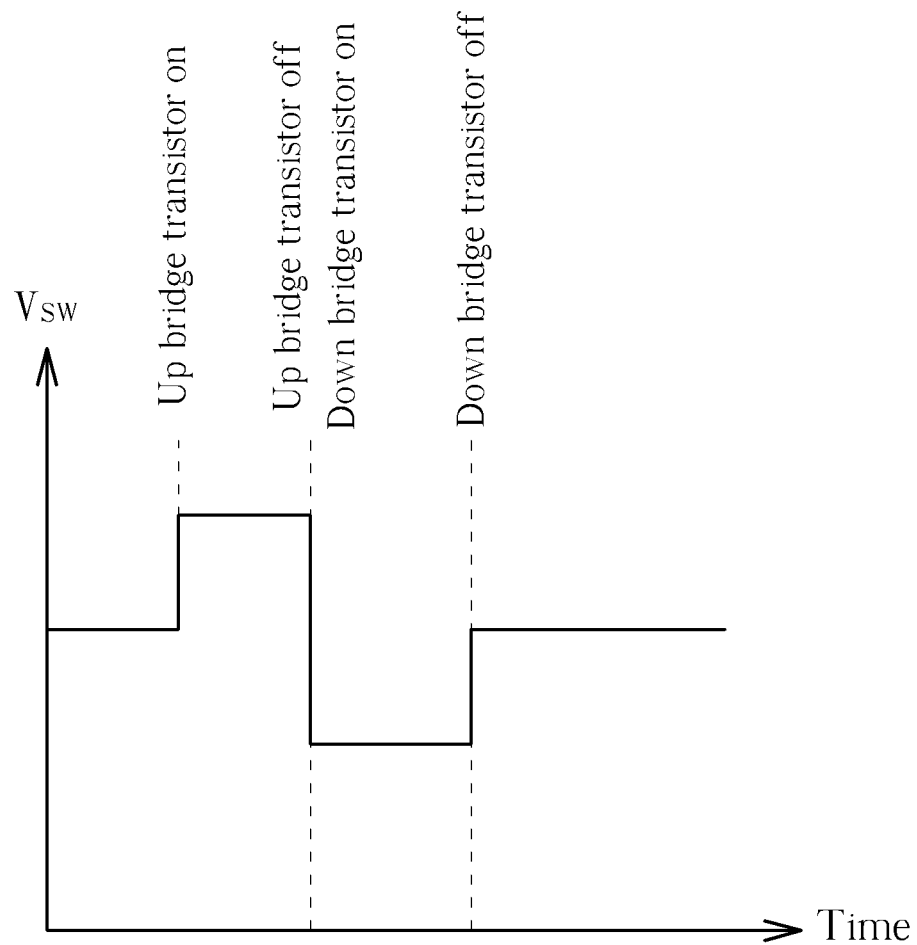
Figure 4:
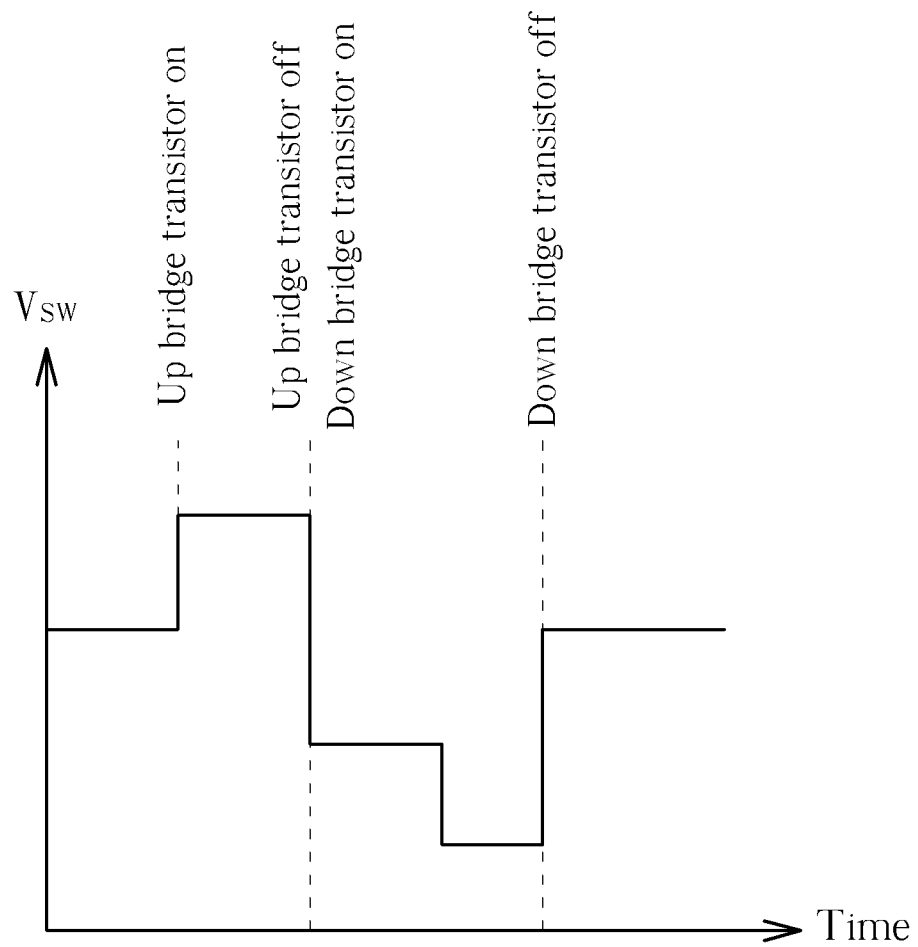

Please refer to FIG. 2, FIG. 3, and FIG. 4. FIG. 2, FIG. 3, and FIG. 4 are diagrams illustrating relation between the moment of the down bridge transistor 102 being turned off and the voltage $V_{SW}$. FIG. 2 is a timing diagram illustrating the down bridge transistor 102 being turned off before the moment of the current on the inductor being zero. FIG. 3 is a timing diagram illustrating the down bridge transistor 102 being turned off accurately at the moment of the current on the inductor being zero. FIG. 4 is a timing diagram illustrating the down bridge transistor 102 being turned off after the moment of the current on the inductor being zero. As shown in FIG. 2, if the down bridge transistor 102 is turned off too early, which means the current on the inductor has not been decreased to zero, the current on the inductor flows to the input power source through the body diode of the transistor 102, and the voltage $V_{SW}$ at the node SW (hereinafter, inductor voltage $V_{SW}$) will be suddenly increased ($V_{SW}=V_{IN}+V_D$, where $V_D$ is the forward voltage of the body diode of the up bridge transistor 101, e.g. 0.7 volt). As shown in FIG. 3, if the down bridge transistor 102 is turned off accurately at the moment of the current on the inductor being zero, the inductor voltage $V_{SW}$ will be zero as well. As shown in FIG. 4, if the down bridge transistor 102 is turned off too late, which means the current on the inductor has been decreased to be negative, the current on the inductor flows to the ground through the body diode of the transistor 102, and the inductor voltage $V_{SW}$ will be decreased to $-V_D$, e.g. 0.7 volt. Therefore, from FIG. 2, FIG. 3, and FIG. 4, it can be seen that the moment of turning off the down bridge transistor 102 can be determined to be too early or too late according to the inductor voltage $V_{SW}$. Simply speaking, the moment of turning off the down bridge transistor 102 has to be within the duration that the inductor voltage $V_{SW}$ is zero, and thus the converting efficiency of the power converter will not be decreased.

Figure 5:
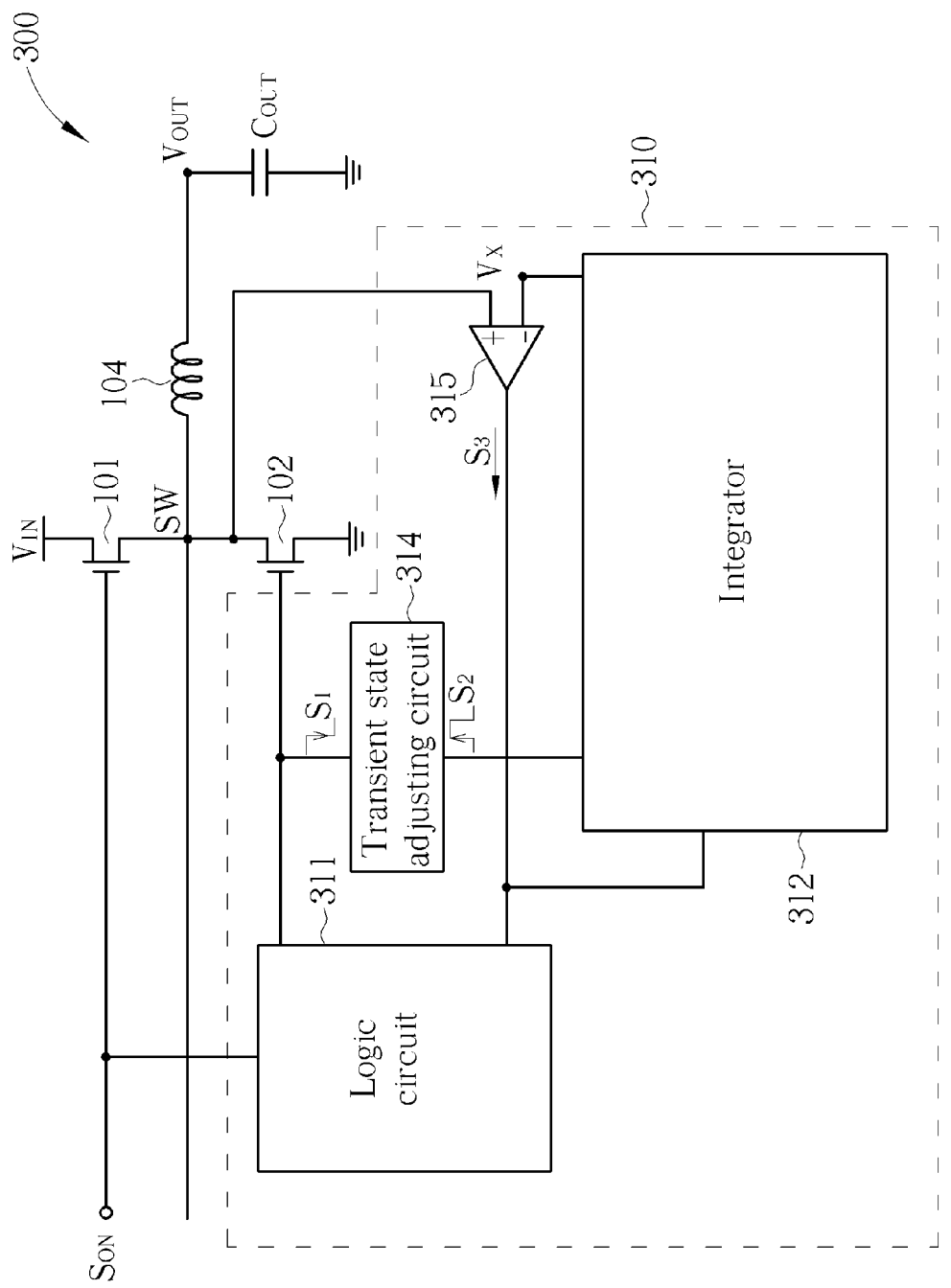
FIG. 5 is a diagram illustrating a synchronous switching power converter according to a first embodiment of the present invention.

Please refer to FIG. 5. FIG. 5 is a diagram illustrating a synchronous switching power converter 300 according to a first embodiment of the present invention. The power converter 300 comprises an up bridge transistor 101, a down bridge transistor 102, an inductor 104, an output capacitor $C_{OUT}$, and a zero current detecting circuit 310. The inductor 104 is coupled between the node SW and the output capacitor $C_{OUT}$ for outputting the power source $V_{OUT}$. The zero current detecting circuit 310 comprises a logic circuit 311, an integrator 312, a transient state adjusting circuit 314, and a zero current comparator 315.

The up bridge transistor 101 receives a turning on signal $S_{ON}$ for accordingly controlling connection between an input power source $V_{IN}$ and a node SW. The down bridge transistor 102 controls connection between the node SW and the ground according to the output of the zero current detecting circuit 310. The zero current comparator 315 compares the changes of the current on the inductor 104. The zero current comparator 315 outputs the signal S3 to turn off the down bridge transistor through the logic circuit 311 when detecting the current on the inductor 104 being zero. The integrator 312 integrates the signals on the negative input end of the zero current comparator 315 so as to adjust the basis of the zero current comparator 315 comparing with the zero current. The direction of the integrator 312 (positive or negative) can be controlled by the output of the zero current comparator 315. The transient state adjusting circuit 314 detects the moment of the down bridge transistor 102 being turned off (i.e. the falling edge of the detecting signal $S_1$) to inform the integrator 312 when to adjust the direction of integrating (i.e. generating the signal $S_2$). In this way, the zero current detecting circuit 310, adjusts the basis of the zero current comparator 315 comparing zero current by utilizing the output of the zero current comparator as feedbacks, and therefore eliminates the offset voltage of the zero current comparator 315, which allows the zero current comparator 315 determines the moment of the current on the inductor 104 being zero accurately so as to control the down bridge transistor 102 to turn off so that the efficiency of the power converter 300 can be increased.

Figure 6:
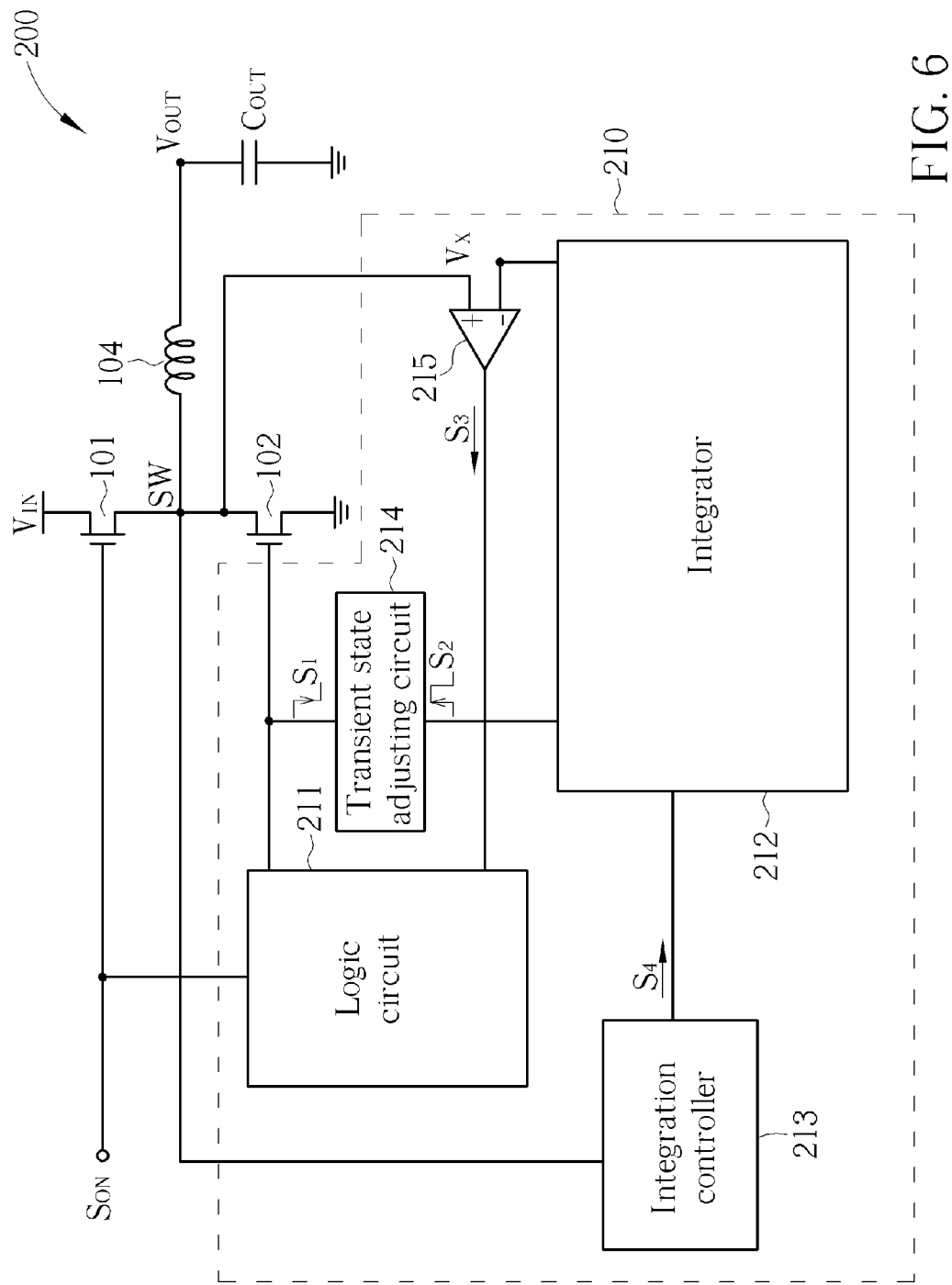
FIG. 6 is a diagram illustrating a synchronous switching power converter according to a second embodiment of the present invention.

Please refer to FIG. 6. FIG. 6 is a diagram illustrating a synchronous switching power converter 200 according to a second embodiment of the present invention. The power converter 200 comprises an up bridge transistor 101, a down bridge transistor 102, an inductor 104, an output capacitor $C_{OUT}$, and a zero current detecting circuit 210. The inductor 104 is coupled between the node SW and the output capacitor $C_{OUT}$ for outputting the power source $V_{OUT}$. The zero current detecting circuit 310 comprises a logic circuit 211, an integrator 212, an integration controller 213, a transient state adjusting circuit 214, and a zero current comparator 215.

The up bridge transistor 101 receives a turning on signal $S_{ON}$ for accordingly controlling connection between an input power source $V_{IN}$ and a node SW. The down bridge transistor 102 controls connection between the node SW and the ground according to the output of the zero current detecting circuit 210. The zero current comparator 215 compares the changes of the current on the inductor 104. The zero current comparator 215 outputs the signal $S_3$ to turn off the down bridge transistor through the logic circuit 211 when detecting the current on the inductor 104 being zero. The integrator 212 integrates the signals on the negative input end of the zero current comparator 215 so as to adjust the basis of the zero current comparator 215 comparing with the zero current. The integration controller 213 generates the signal $S_4$ to control the direction of the integrator 212 (positive or negative) according to the voltage $V_{SW}$ at the node SW. The transient state adjusting circuit 214 detects the moment of the down bridge transistor 102 being turned off (i.e. the falling edge of the detecting signal $S_1$) to inform the integrator 212 when to adjust the direction of integrating (i.e. generating the signal $S_2$). More particularly, within a transient duration $T_P$ after the down bridge transistor 102 is turned off, if the integration controller 213 determines the voltage $V_{SW}$ is negative, which means the down bridge transistor 102 is turned off too late, the integration controller 213 controls the integrator 212 to integrate positively to increase the basis of the zero current comparator 215 comparing zero current, which advances the moment the signal $S_3$ outputs and the moment the down bridge transistor 102 is to be turned off. Oppositely, within the transient duration $T_P$ after the down bridge transistor 102 is turned off, if the integration controller 213 determines the voltage $V_{SW}$ is positive, which means the down bridge transistor 102 is turned off too early, the integration controller 213 controls the integrator 212 to integrate negatively to decrease the basis of the zero current comparator 215 comparing zero current, which delays the moment the signal $S_3$ outputs and the moment the down bridge transistor 102 is to be turned off. In this way, the zero current detecting circuit 210, adjusts the basis of the zero current comparator 215 comparing zero current by monitoring voltage at the node SW, and therefore eliminates the offset voltage of the zero current comparator 215, which allows the zero current comparator 215 determines the moment of the current on the inductor 104 being zero accurately so as to control the down bridge transistor 102 to turn off so that the efficiency of the power converter 200 can be increased.

Figure 7:
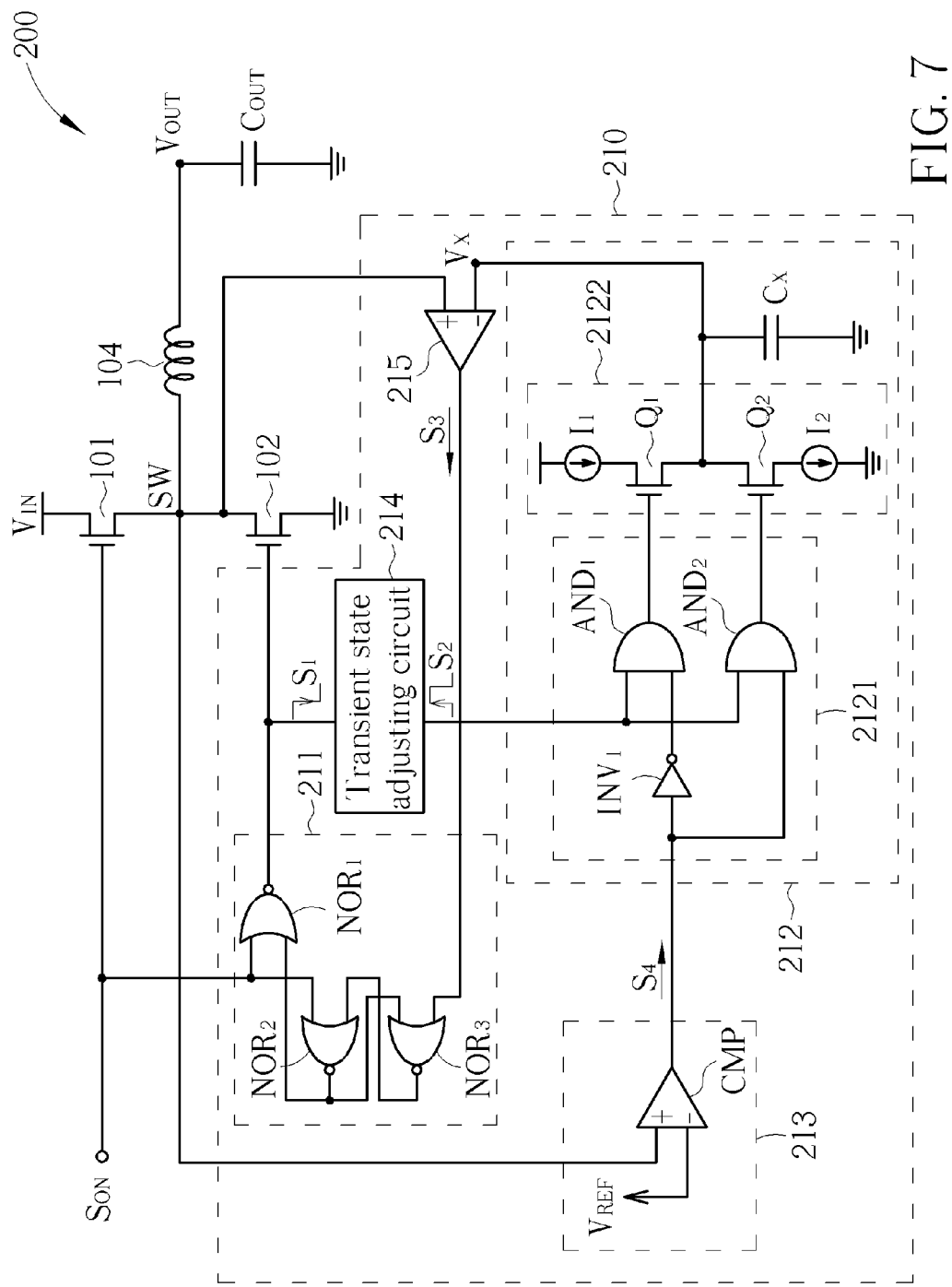
FIG. 7 is a diagram illustrating details of the synchronous switching power converter according to the second embodiment of the present invention.

Please refer to FIG. 7. FIG. 7 is a diagram illustrating details of the synchronous switching power converter 200 according to the second embodiment of the present invention. In FIG. 7, the logic circuit 211 can be realized with three NOR gates $NOR_1$, $NOR_2$, and $NOR_3$; the integrator 212 can be realized with a logic circuit 2121, a charge/discharge module 2122, and a capacitor $C_X$; the integration controller 213 can be realized with a comparator CMP; the transient state adjusting circuit 214 can be realized with a one shot circuit. The charge/discharge module 2122 comprises two constant current sources $I_1$ and $I_2$, and two transistors $Q_1$ and $Q_2$. Preferably, the currents supplied by the constant current sources $I_1$ and $I_2$ both are I. In addition, the logic circuit 2121 comprises two AND gates $AND_1$ and $AND_2$, and an inverter $INV_1$. In the following description, the operating principle of the zero current detecting circuit of the present invention is explained in details according to the structure of FIG. 7.

The up bridge transistor 101 receives a turning on signal $S_{ON}$ for accordingly controlling connection between an input power source $V_{IN}$ and a node SW. The down bridge transistor 102 controls connection between the node SW and the ground according to the output of the zero current detecting circuit 210. The zero current comparator 215 compares the changes of the current on the inductor 104. The zero current comparator 215 outputs the signal S3 to turn off the down bridge transistor through the logic circuit 211 when detecting the current on the inductor 104 being zero. In other words, the zero current comparator 215 compares voltage on its positive input end and the voltage $V_X$ on its negative input end, and when the voltage on its positive input end is lower than the voltage $V_X$ on its negative input end, the zero current comparator 215 outputs the signal $S_3$ with a low level and turns off the down bridge transistor 102 through the logic circuit 211. At the moment the down bridge transistor 102 being turned off, the transient state circuit 214 is triggered by the falling edge of the signal $S_1$ for generating a pulse signal $S_2$ with a predetermined pulse width, and hereinafter the duration of the pulse signal $S_2$ is referred as the transient period TP. The integrator 212 integrates the signals on the negative input end of the zero current comparator 215 so as to adjust the voltage $V_X$. More particularly, in the integrator 212, the logic circuit 2121 controls the charge/discharge module 2122 to charge/discharge the capacitor $C_X$ in the transient period $T_P$ according to the signal $S_4$. If the integration controller 213 indicates to integrate negatively, the constant current source $I_2$ of the charge/discharge module 2122 discharges the capacitor $C_X$ through the transistor $Q_2$ to lower the voltage $V_X$; if the integration controller 213 indicates to integrate positively, the constant current source $I_1$ of the charge/discharge module 2122 charges the capacitor $C_X$ through the transistor $Q_1$ to increase the voltage $V_X$. The integration controller 213 can be a comparator CMP wherein the positive input end is coupled to the node SW for receiving the voltage $V_{SW}$, the negative input end receives a reference voltage $V_{REF}$, which is assumed to 0 volt, and the output end outputs the signal $S_4$. When the comparator CMP determines the voltage $V_{SW}$ is lower than the reference voltage $V_{REF}$, which means the down bridge transistor 102 is turned off too late, the signal $S_4$ controls the charge/discharge module 2122 of the integrator 212 to charge the capacitor $C_X$ to increase the voltage $V_X$ within the transient period $T_P$, so as to advance the moment the down bridge transistor 102 being turned off. Oppositely, when the comparator CMP determines the voltage $V_{SW}$ is higher than the reference voltage $V_{REF}$, which means the down bridge transistor 102 is turned off too early, the signal $S_4$ controls the charge/discharge module 2122 of the integrator 212 to discharge the capacitor $C_X$ to decrease the voltage $V_X$ within the transient period $T_P$, so as to delay the moment the down bridge transistor 102 being turned off.

In addition, the integrator 212 is disposed mainly to provide the voltage $V_X$ to compensate the offset voltage $V_{OFFSET}$ of the zero current comparator 215. Ideally, the zero current comparator 215 should detect if the current on the inductor 104 is decreased to zero, which means the actual voltage to be compare with the voltage $V_{SW}$ should be ground (0 volt). However, since the offset voltage $V_{OFFSET}$ exists in the zero current comparator 215, the zero current comparator 215 becomes to compare the offset voltage $V_{OFFSET}$ and the voltage $V_{SW}$, which means the actual current level the zero current comparator 215 compares is not zero and therefore, the moment the current on the inductor 104 being zero cannot be accurately detected. After the compensation of the integrator 212, the zero current comparator 215 becomes to compare the voltages $V_X$ and $V_{SW}$, i.e. the voltages ($V_{OFFSET}+V_x$) and $V_{SW}$. In other words, the voltage $V_X$ is utilized to eliminate the offset voltage $V_{OFFSET}$ and makes the zero current comparator 215 determine if the voltage $V_{SW}$ is zero accurately and accordingly output the signal $S_3$.

Since the size of the offset voltage $V_{OFFSET}$ cannot be known in advance, the present invention adjusts the integrated value of the integrator 212 according to the value of the current on the inductor 104 (being positive or negative) and provide the adjusted value to the zero current comparator 215 to eliminate the effect of the offset voltage. As can be seen in FIG. 7, the comparator CMP compares the reference voltage $V_{REF}$ and the voltage $V_{SW}$ and the reference voltage is set to be 0 volt. Thus, when the voltage $V_{SW}$ is higher than 0 volt, the signal $S_4$ of the comparator CMP is logic 1, which means the down bridge transistor 102 is turned off too early and the voltage $V_X$ is to be increased; when the voltage $V_{SW}$ is lower than 0 volt, the signal $S_4$ of the comparator CMP is logic 0, which means the down bridge transistor 102 is turned off too late and the voltage $V_X$ is to be decreased. When the signal $S_4$ is logic 1, within the transient period $T_P$, the integrator 212 integrate positively, which means the charge/discharge module 2122 charges the capacitor $C_X$ by the constant current source $I_1$ through the transistor $Q_1$ to increase the voltage $V_X$. When the signal $S_4$ is logic 0, within the transient period $T_P$, the integrator 212 integrate negatively, which means the charge/discharge module 2122 discharges the capacitor by the constant current source $I_2$ through the transistor $Q_2$ to decrease the voltage $V_X$.

Simply speaking, the present invention utilizes the zero current comparator 215, the integration controller 213, and the integrator 212 in the zero current detecting circuit 210. The zero current comparator mainly determines the changes on the current on the inductor 104 for accordingly turning off the down bridge transistor 102. Due to the offset voltage $V_{OFFSET}$ of the zero current comparator 215, the integration controller 213 and the integrator 212 are utilized to adjust the comparing level of the zero current comparator 215 to eliminate the effect of the offset voltage $V_{OFFSET}$. The integration controller 213 determines if the current on the inductor 104 is zero when the down bridge transistor 102 is turned off by the zero current comparator 215 to know if the moment the transistor 102 being turned off is too early/late, and to accordingly control the integrator 212 to integrate positively or negatively. The zero current comparator 215 can accurately determine the moment the current on the inductor being zero by the adjustment of the integrator 212 and accurately turn off the down bridge transistor 102, and in this way, the conduction loss and the switching loss can be avoided.

Figure 8:
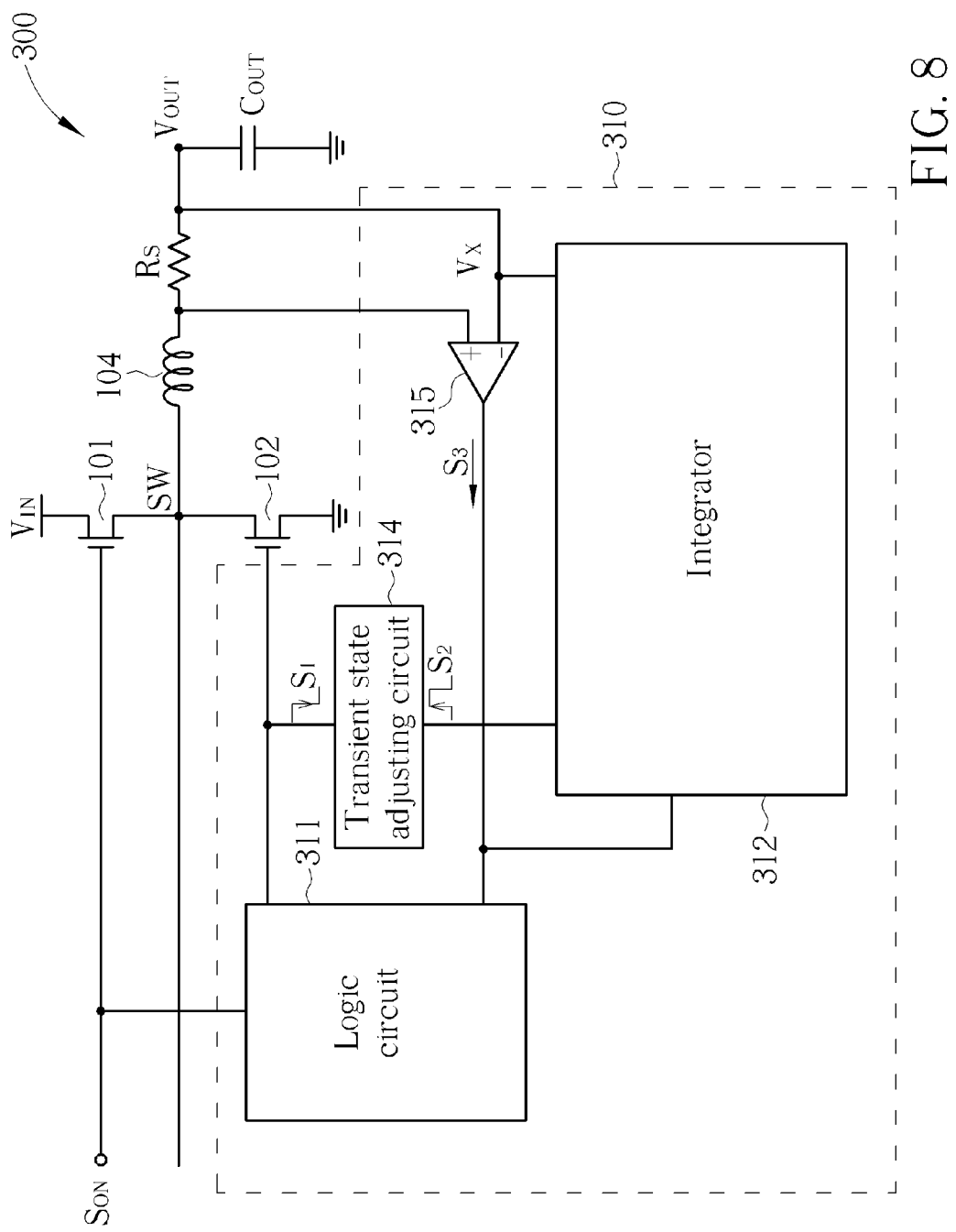
FIG. 8 is a diagram illustrating the present detecting the current on the inductor by coupling a sensing resistor in series with the inductor.

Furthermore, the manner the present invention detecting the current on the inductor can be realized with a sensing resistor coupled in series with the inductor. Please refer to FIG. 8. FIG. 8 is a diagram illustrating the present detecting the current on the inductor by coupling a sensing resistor in series with the inductor. The embodiment in FIG. 8 is a modification of the synchronous switching power converter 300 according to the first embodiment of the present invention. More particularly, in FIG. 8, the way detecting the current on the inductor 104 is modified by a resistor $R_S$ coupling in series with the inductor 104. As shown in FIG. 8, the two input ends of the zero current comparator 315 are coupled to the two ends of the sensing resistor $R_S$ respectively so that the voltage drop on the resistor RS can be utilized to determine the moment the current on the inductor 104 being zero, where the related principles should be well known to those skilled in the art and thus are omitted for brevity. In addition, the synchronous switching power converter 200 of the second embodiment of the present invention can also be modified as those modifications in FIG. 8 and should be well known to those skilled in the art and thus are omitted for brevity.

Figure 9:
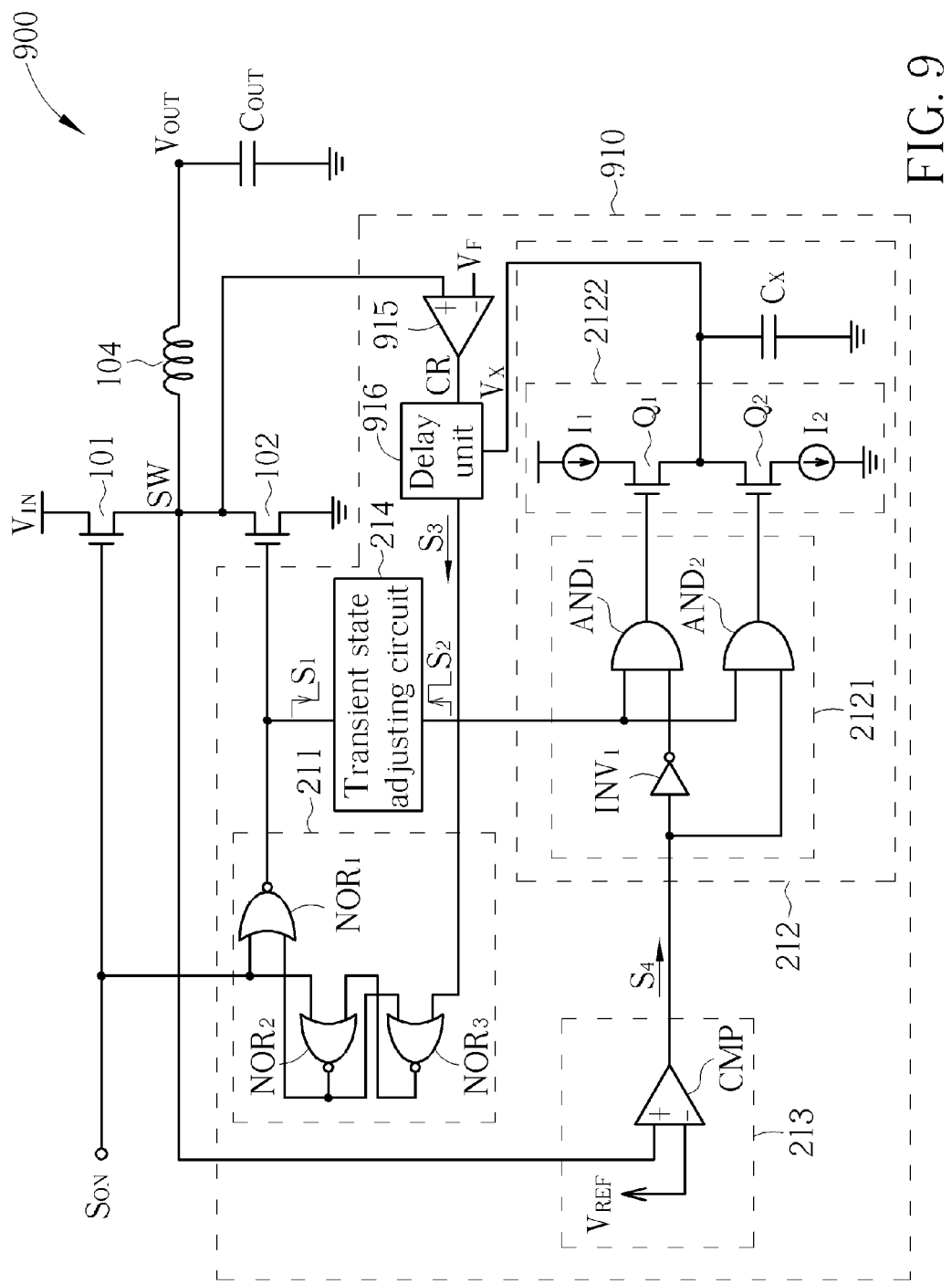
FIG. 9 is a diagram illustrating details of a synchronous switching power converter according to a third embodiment of the present invention.

Moreover, please refer to FIG. 9. FIG. 9 is a diagram illustrating details of a synchronous switching power converter 900 according to a third embodiment of the present invention. The synchronous switching power converter 900 is similar to the synchronous switching power converter 200 shown in FIG. 9, and thus elements and signals with similar functions are denoted by the same symbols. The main difference between the synchronous switching power converter 900 and the synchronous switching power converter 200 is that the synchronous switching power converter 900 comprises a zero current comparator 915 and a delay unit 916, and the zero current comparator 915 receives a fixed comparing level $V_F$ at a negative input end for comparison to output a comparing result CR and the delay unit 916 delays the comparing result CR to generate the signal S3 according to the voltage $V_X$.

In detail, the zero current comparator 915 and the delay unit 916 operate according to the changes of the current on the inductor 104, to output the signal S3 to turn off the down bridge transistor through the logic circuit 211 when detecting the current on the inductor 104 being zero. In other words, the zero current comparator 915 compares voltage on its positive input end and the fixed comparing level $V_F$ on its negative input end, and when the voltage on its positive input end is lower than the fixed comparing level $V_F$ on its negative input end, the zero current comparator 915 outputs the comparing result CR with a low level and the delay unit 916 delays the comparing result CR with the low level to generate the signal S3 with a low level according to the voltage $V_X$, to turns off the down bridge transistor 102 through the logic circuit 211. At the moment the down bridge transistor 102 being turned off, the transient state circuit 214 is triggered by the falling edge of the signal $S_1$ for generating a pulse signal $S_2$ with a predetermined pulse width, and hereinafter the duration of the pulse signal $S_3$ is referred as the transient period TP. The integrator 212 integrates the signals on the negative input end of the zero current comparator 915 so as to adjust the voltage V. More particularly, in the integrator 212, the logic circuit 2121 controls the charge/discharge module 2122 to charge/discharge the capacitor $C_X$ in the transient period $T_P$ according to the signal $S_4$. If the integration controller 213 indicates to integrate negatively, the constant current source $I_2$ of the charge/discharge module 2122 discharges the capacitor $C_X$ through the transistor $Q_2$ to lower the voltage $V_X$; if the integration controller 213 indicates to integrate positively, the constant current source $I_1$ of the charge/discharge module 2122 charges the capacitor $C_X$ through the transistor $Q_1$ to increase the voltage $V_X$. The integration controller 213 can be a comparator CMP wherein the positive input end is coupled to the node SW for receiving the voltage $V_{SW}$, the negative input end receives a reference voltage $V_{REF}$, which is assumed to 0 volt, and the output end outputs the signal $S_4$. When the comparator CMP determines the voltage $V_{SW}$ is lower than the reference voltage $V_{REF}$, which means the down bridge transistor 102 is turned off too late, the signal $S_4$ controls the charge/discharge module 2122 of the integrator 212 to charge the capacitor $C_X$ to increase the voltage $V_X$ within the transient period $T_P$, such that the delay unit 916 delays the comparing result CR with the low level less to generate the signal S3 with the low level earlier according to the increased voltage $V_X$, to advance the moment the down bridge transistor 102 being turned off. Oppositely, when the comparator CMP determines the voltage $V_{SW}$ is higher than the reference voltage $V_{REF}$, which means the down bridge transistor 102 is turned off too early, the signal $S_4$ controls the charge/discharge module 2122 of the integrator 212 to discharge the capacitor $C_X$ to decrease the voltage $V_X$ within the transient period $T_P$, such that the delay unit 916 delays the comparing result CR with the low level more to generate the signal S3 with the low level later according to the increased voltage $V_X$, to delay the moment the down bridge transistor 102 being turned off.

To sum up, the zero current detecting circuit of the present invention controls the comparing level of the zero current comparator or delays the comparing result of the zero current comparator with a fixed comparing level by adjusting the integrated value for accurately detecting the moment the current on the inductor being zero and accordingly turns off the transistor. In this way, the switching loss and the conduction loss can be avoided, providing great convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A synchronous switching power converter with zero current detection, comprising:
   an inductor;
   a down bridge transistor coupled to the inductor and a ground as a synchronous rectifier as the synchronous switching power converter; and
   a zero current detecting circuit comprising:
      a zero current comparator coupled between the inductor and the down bridge transistor for receiving a fixed comparing level at a negative input end for comparison to change state of a comparing result;
      a delay unit, for delaying the comparing result to change state of a turn off signal according to a compensation voltage, to turn off the down bridge transistor when determining current on the inductor is zero;
      a transient state adjusting circuit coupled to the zero current comparator for indicating a transient period when detecting state of the turn off signal is changed; and
      an integrator coupled to the zero current comparator and the transient state adjusting circuit for integrating the compensation voltage by analog manner to adjust value of the compensation voltage and providing to the delay unit within the transient period;
      wherein the zero current comparator determines the integrator to integrate positively or negatively within the transient period.

2. The synchronous switching power converter of claim 1, wherein the zero current detecting circuit further comprises:
   an integration controller, comprising a comparator coupled between the inductor and the integrator for comparing current on the inductor and a reference voltage for accordingly controlling the integrator to integrate positively or negatively.

3. The synchronous switching power converter of claim 1, wherein the integrator comprises:
   a capacitor coupled to the zero current comparator for providing the compensation voltage; and a charge/discharge module coupled between the capacitor and the integration controller or the zero current comparator for charging or discharging the capacitor so as to adjust the compensation voltage.

4. The synchronous switching power converter of claim 3, wherein the charge/discharge module comprises a charge current source and a first transistor so that the charge current source charges the capacitor through the first transistor.

5. The synchronous switching power converter of claim 4, wherein the charge/discharge module further comprises a discharge current source and a second transistor so that the discharge current source discharges the capacitor through the second transistor.

6. The synchronous switching power converter of claim 1, further comprising an up bridge transistor coupled between the inductor and an input power source for coupling the input power source to the inductor according to a turn on signal.

7. The synchronous switching power converter of claim 1, wherein the zero current detecting circuit further comprises a sensing resistor coupled in series with the inductor and coupled to the zero current comparator, for sensing value of current of the inductor and providing to the zero current comparator.

* * * * *